July 5, 1932.    C. P. DEIBEL    1,866,016
DRY CELL AND SEAL THEREFOR
Filed June 30, 1931
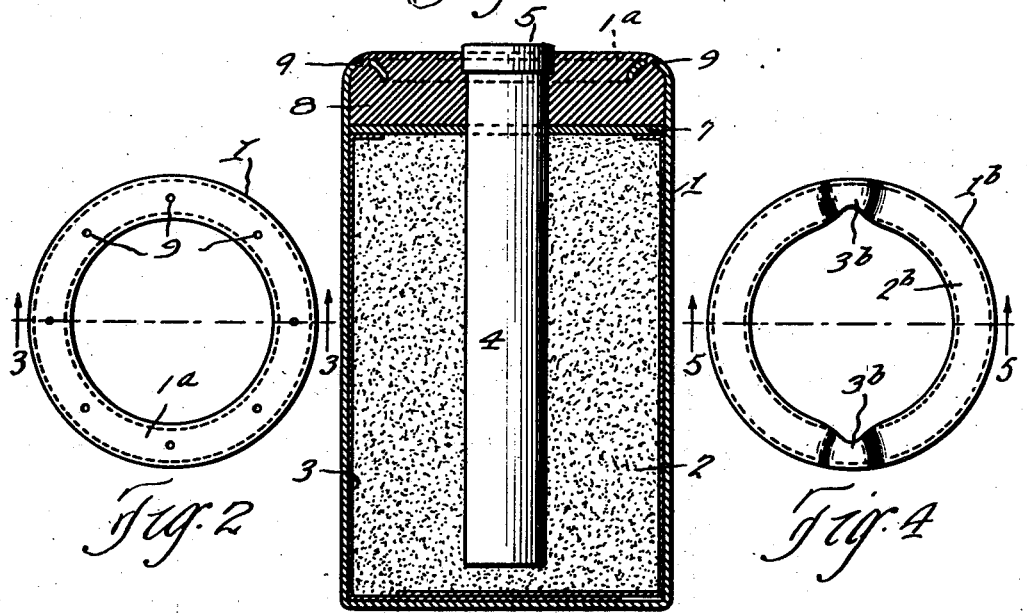
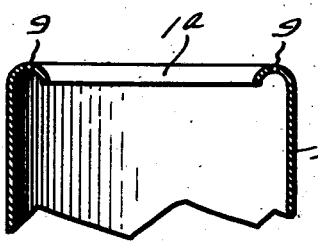
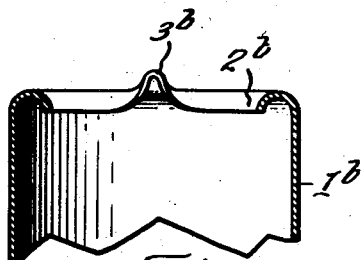
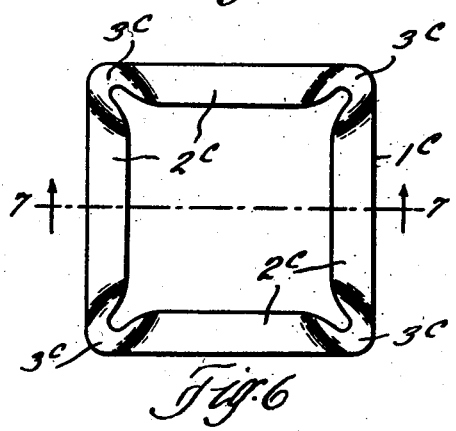
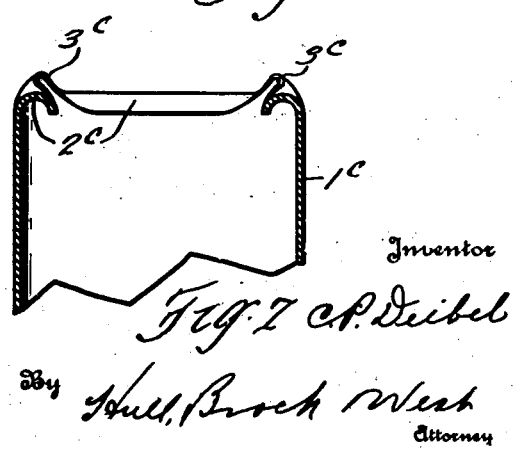

Patented July 5, 1932

1,866,016

UNITED STATES PATENT OFFICE

CYRIL P. DEIBEL, OF LAKEWOOD, OHIO

DRY CELL AND SEAL THEREFOR

Application filed June 30, 1931. Serial No. 547,934.

This invention relates to dry cells of various sizes, the best known of which are the sizes used in flashlights, as well as larger cells such as are generally known as 6-inch dry cells, commonly used for operating telephones, ignition systems and electric signals. Such cells may also be assembled in series or multiple to form the well known radio B batteries and other multiple cell batteries.

It is generally assumed that the sealing compounds used in sealing dry cells form an air-tight joint between the metal container and the seal. This assumption is not correct as the sealing compounds generally do not bond well with the smooth metallic surface of the zinc container. Furthermore, the sealing compounds contract when cooled and pull away from the metallic zinc cylinder. Moreover, the zinc container has a different coefficient of expansion than the sealing material and with temperature changes the zinc cylinder expands and contracts and breaks away from the hard seal. Shocks incidental to shipment and handling of the cells also tend to break the bond between the smooth metallic surface and the seal. Since an air-tight bond is not obtained, air can pass in and out of the cells between the metallic container and the seal principally because of changes in temperature. The egress of air or gas carries with it moisture from the cell causing the materials in the cell to become drier and less efficient after long periods of time.

Therefore, one of the main objects of this invention is to provide a seal which will prevent or reduce to a minimum the passage of air or gas into and out of the cell.

Heretofore the shelf life of dry cells, and their efficiency after standing idle for long periods of time, has been impaired due to what is known as "breathing" of the cells which results in drying out of the materials forming the cell and a general decrease in the life of the cell. The improved seal which I have provided tends to prevent or to reduce to a minimum this so-called "breathing".

A further object of the invention is to provide a dry cell which will accomplish the objects of the invention as hereinbefore stated and which can be produced in quantity production at a minimum cost.

A further object of the invention is to provide a dry cell of the character described which is provided with means for interlocking the layer of sealing material with the container in such a manner as to prevent the seal from receding from the container due to contraction, thus providing a substantially air-tight joint between the metal container and the sealing material.

Further and more limited objects of the invention will appear as the description proceeds and by reference to the accompanying drawing in which Fig. 1 is a vertical sectional view of a dry cell disclosing the main features of my invention; Fig. 2 is a top plan view of the metal container; Fig. 3 is a fragmentary vertical sectional view on the line 3—3 of Fig. 2; Fig. 4 is a top plan view of a slightly different form of my invention disclosing a metal container having a different form of vent; Fig. 5 is a fragmentary sectional view on the line 5—5 of Fig. 4; Fig. 6 is a top plan view of a rectangular container; and Fig. 7 is a sectional view on the line 7—7 of Fig. 6.

Referring now to the drawing, Figs. 1, 2 and 3, the reference character 1 designates a container or electrode which is preferably formed of zinc and has its upper edge turned over inwardly and downwardly as shown at 1ª. Arranged within the container 1 is a mass of depolarizing mix 2 which is insulated from the container by means of a lining 3 formed of some suitable material, such as paper. Also arranged within the zinc container is a carbon electrode 4 which is disposed centrally of the container and extends above the upper end thereof and is there provided with a brass cap 5 in accordance with the usual construction. Surrounding the carbon electrode 4 and covering the upper end of the mass of mix is a washer 7 formed of suitable material. Disposed above the washer 7 and closing the upper end of the zinc container is a mass of sealing material 8 of the desired constituency. The inturned portion 1ª of the zinc container is provided with a plurality of openings 9 which serve as vents to permit the air to escape therethrough when the hot sealing material is poured into the upper end of the cell. The number of these vent openings may be increased or decreased depending upon the size and the shape of the cell. If these vent openings were not provided, some air would be trapped in this turned-over portion of the zinc container, thus reducing the effectiveness of the seal.

The sealing material is poured into the top of the cell while hot up to about the level shown in Fig. 1. Due to the shape of the inturned edge of the container, an interlock is formed with the seal which prevents the sealing material from receding from the walls of the container as it cools. It will be seen that the seal extends both above and below the inturned portion 1ª and that a substantially airtight bond is obtained between the metal container and the seal; and consequently a contraction of the hot seal due to cooling will not cause it to pull away from the metal container. The seal also encompasses and bonds with the metal cap 5 which fits over the upper end of the carbon electrode. In this way the so-called "breathing" is substantially prevented, or at least reduced to a minimum.

In Figs. 4 and 5, there is disclosed a modification of my invention in which the metal container 1ᵇ is circular in shape and has its upper edge turned over inwardly and downwardly as shown at 2ᵇ and provided with a plurality of openings 3ᵇ which serve as vents and permit the air to escape therethrough when the hot sealing material is poured into the upper end of the cell. This form of the invention is otherwise identical with that shown in Figs. 1 to 3 inclusive except that the vent openings take a slightly different form. The construction of the cell is identical with that described in connection with the forms of the invention hereinbefore mentioned.

In Figs. 6 and 7 there is disclosed a further modification of my invention in which the metal container 1ᶜ is square or rectangular in cross section. In this form of the invention the upper edge of the metal container is turned over inwardly and downwardly as shown at 2ᶜ and the corners are bent upwardly as shown at 3ᶜ to provide vents. In other respects this form of the invention is identical with that disclosed in Figs. 4 and 5.

When these cells are to be used as flashlight cells, the zinc container is enclosed with a suitable wrapper of insulating material.

Various other changes may be made in the details of construction as well as in the manner of assembling the cell without departing from the spirit of the invention. Various other shapes may be given to the inturned edge of the container without departing from the spirit of the invention and the several embodiments of the invention herein disclosed are merely illustrative and are not to be considered in a limiting sense.

Having thus described my invention, what I claim is:

1. A dry cell comprising a metal container, a mass of depolarizing mix partially filling said container and insulated therefrom, an electrode disposed within said mass of mix, the upper edges of said container being bent over inwardly and downwardly, and having vent openings therein, a mass of sealing material extending above and below said curled edges and interlocking with said container.

2. A dry cell comprising a metal container, a mass of depolarizing mix disposed within said container and insulated therefrom, an electrode arranged within said mass of mix, the upper edges of said container being curled inwardly and downwardly, and a mass of sealing material closing the upper end of said container and extending above and below said curled over edges and interlocking with said container, said inwardly bent portion having one or more openings therein.

3. A dry cell comprising a metal container, a mass of depolarizing mix disposed within said container and insulated therefrom, an electrode arranged within said mass of mix, the upper edges of said container being bent over inwardly and downwardly, and a mass of sealing material closing the upper end of said container and extending over both sides of the inturned edge of said container and forming an interlock between the container seal and outer container, and means venting the bent over portion of said container.

4. A dry cell comprising a rectangular metal container, the upper edges of which are bent over inwardly and downwardly, a mass of mix and an electrode arranged within said container and insulated therefrom, a seal closing the upper end of said container and extending above and below said curled portion, the upper corners of said container being bent to provide vents for said bent over portion.

5. A dry cell comprising a metal electrode in the form of a container, a mass of mix partially filling said container and insulated therefrom, an inner electrode within said mass of mix, the upper end of said container being bent over inwardly and downwardly, a mass of sealing material closing the upper end of said container and encompassing said inwardly and downwardly turned edge and interlocking therewith, said inwardly and downwardly turned portion having one or more vent openings therein.

6. A dry cell comprising a metal container, a mass of depolarizing mix partially filling said container and insulated therefrom, a carbon electrode disposed within said mass of mix, the upper edges of said container being bent over inwardly and downwardly, and a mass of sealing material sealing the upper end of said container and encompassing the upper edges thereof and interlocking therewith and disposed partially inside and partially outside of said container.

7. A dry cell comprising a metal container the upper edges of which are turned over inwardly and then downwardly, a mass of depolarizing mix substantially filling said container and insulated therefrom, a carbon electrode disposed within said mass of mix and extending to a point adjacent the top of said container, and a mass of sealing material closing the upper end of said container and disposed above and below said turned over portion and interlocking therewith.

In testimony whereof, I hereunto affix my signature.

CYRIL P. DEIBEL.